(12) United States Patent
Wolfington

(10) Patent No.: US 8,382,074 B1
(45) Date of Patent: Feb. 26, 2013

(54) SYSTEM AND METHOD FOR SATURATING A LIQUID WITH A GAS

(76) Inventor: Don W. Wolfington, Medford, OR (US)

( * ) Notice: Subject to any disclaimer, the term of this patent is extended or adjusted under 35 U.S.C. 154(b) by 424 days.

(21) Appl. No.: 12/762,475

(22) Filed: Apr. 19, 2010

Related U.S. Application Data

(60) Provisional application No. 61/218,391, filed on Jun. 18, 2009.

(51) Int. Cl.
*B01F 3/04* (2006.01)
(52) U.S. Cl. .............................. 261/94; 261/117; 96/296
(58) Field of Classification Search ............... 261/94, 261/117; 96/243, 296; 55/518
See application file for complete search history.

(56) References Cited

U.S. PATENT DOCUMENTS

| | | | |
|---|---|---|---|
| 3,635,200 A | 1/1972 | Runell et al. | |
| 3,828,736 A | 8/1974 | Koch | |
| 4,135,483 A | 1/1979 | Edwards | |
| 4,205,591 A | 6/1980 | Mickelson | |
| 4,376,423 A | 3/1983 | Knapstein | |
| 7,100,583 B2 | 9/2006 | Lu | |
| 7,188,470 B2 | 3/2007 | Bosteels | |
| 7,226,568 B1 * | 6/2007 | Ham et al. | 422/218 |

* cited by examiner

*Primary Examiner* — Robert A Hopkins
(74) *Attorney, Agent, or Firm* — Jerry Haynes Law

(57) ABSTRACT

A system for saturating a liquid with a gas includes a first screen box, a particulate material provided in the first screen box, a liquid inlet disposed in fluid communication with the first screen box, a second screen box disposed in fluid communication with the first screen box, a gas inlet disposed in fluid communication with the second screen box; and an outlet conduit disposed in fluid communication with the second screen box.

16 Claims, 4 Drawing Sheets

SYSTEM AND METHOD FOR SATURATING A LIQUID WITH A GAS

CROSS-REFERENCE TO RELATED APPLICATIONS

This application claims the benefit of and incorporates by reference in its entirety U.S. provisional application No. 61/218,391, filed Jun. 18, 2009 and entitled "System for Saturating a Liquid Fuel with a Gas".

FIELD OF THE INVENTION

The disclosure generally relates to systems which saturate a liquid with a gas. More particularly, the disclosure relates to a system which saturates a liquid with a gas and is suitable for saturating fuel with air or oxygen in automotive or other applications and a method of saturating a liquid with a gas.

BACKGROUND OF THE INVENTION

Systems are known for saturating a liquid with a gas in a variety of applications. For example, a variety of fuel systems for introducing a fuel/air mixture into an internal combustion engine are known. Some internal combustion engines include a carburetor in which a liquid fuel is vaporized in a fixed or variable venturi as air from the atmosphere is fed through the venturi, drawing the vaporized fuel into the intake manifold and cylinders of the engine. Modern gasoline and diesel engines include a fuel injection system in which fuel is injected directly into a combustion chamber under high pressure and a spark does not ignite the fuel. Typically, air is drawn into the combustion chamber and compressed prior to injection of the fuel into the chamber. Fuel injection systems have also been adapted for use with conventional spark-ignition internal combustion engines to improve the fuel efficiency of the engines.

Other conventional carburetor-type fuel systems facilitate bubbling of air through a liquid fuel in order to vaporize the fuel. Rather than saturating the fuel with air or oxygen, however, these systems vaporize the liquid in the air. In some fuel systems, gases are fed into a carburetor at the same time a hydrocarbon fuel is vaporized in the carburetor.

In some applications, liquids have been saturated with gases such as carbon dioxide to form soda water or to increase the gas content in malt drinks such as beer. Saturated liquids, however, must be maintained under pressure until just prior to use to maintain the gases in a saturated state in the liquids. A need remains for a system and method which overcome the drawbacks of conventional systems and methods that saturate a liquid with a gas.

SUMMARY OF THE INVENTION

The disclosure is generally directed to a system for saturating a liquid with a gas. An illustrative embodiment of the system includes a first screen box, a particulate material provided in the first screen box, a liquid inlet disposed in fluid communication with the first screen box, a second screen box disposed in fluid communication with the first screen box, a gas inlet disposed in fluid communication with the second screen box; and an outlet conduit disposed in fluid communication with the second screen box.

In some embodiments, the system may include a system housing; a housing lid having a housing slot carried by the system housing; a first screen box provided in the system housing; a particulate material provided in the first screen box; a liquid inlet disposed in fluid communication with the first screen box; a second screen box extending through the housing slot of the housing lid and disposed in fluid communication with the first screen box; a gas inlet opening provided in the system housing and disposed in fluid communication with the first screen box and the second screen box; and an outlet conduit disposed in fluid communication with the second screen box.

The disclosure is further generally directed to a method of saturating a liquid with a gas. An illustrative embodiment of the method includes providing a system having a first screen box, a particulate material provided in the first screen box and a second screen box disposed in fluid communication with the first screen box; distributing a flow of liquid into the first screen box; catalyzing formation of fumes from the liquid by contacting the liquid with the particulate material; distributing a flow of gas into the second screen box; and forming a fume/gas mixture by at least partially saturating the fumes with the gas in the second screen box.

BRIEF DESCRIPTION OF THE DRAWINGS

The disclosure will now be made, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
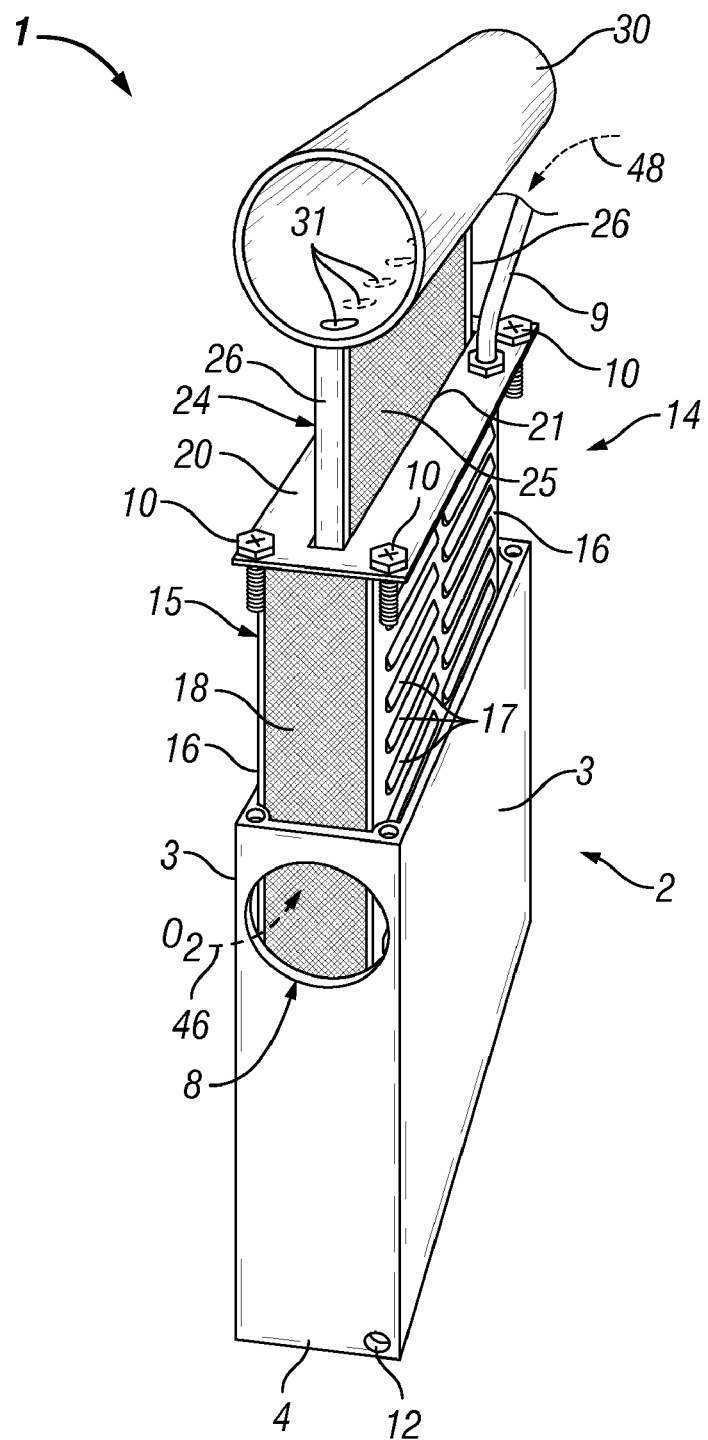
FIG. 1 is an exploded side perspective view of an illustrative embodiment of the system for saturating a liquid with a gas.
Figure 2:
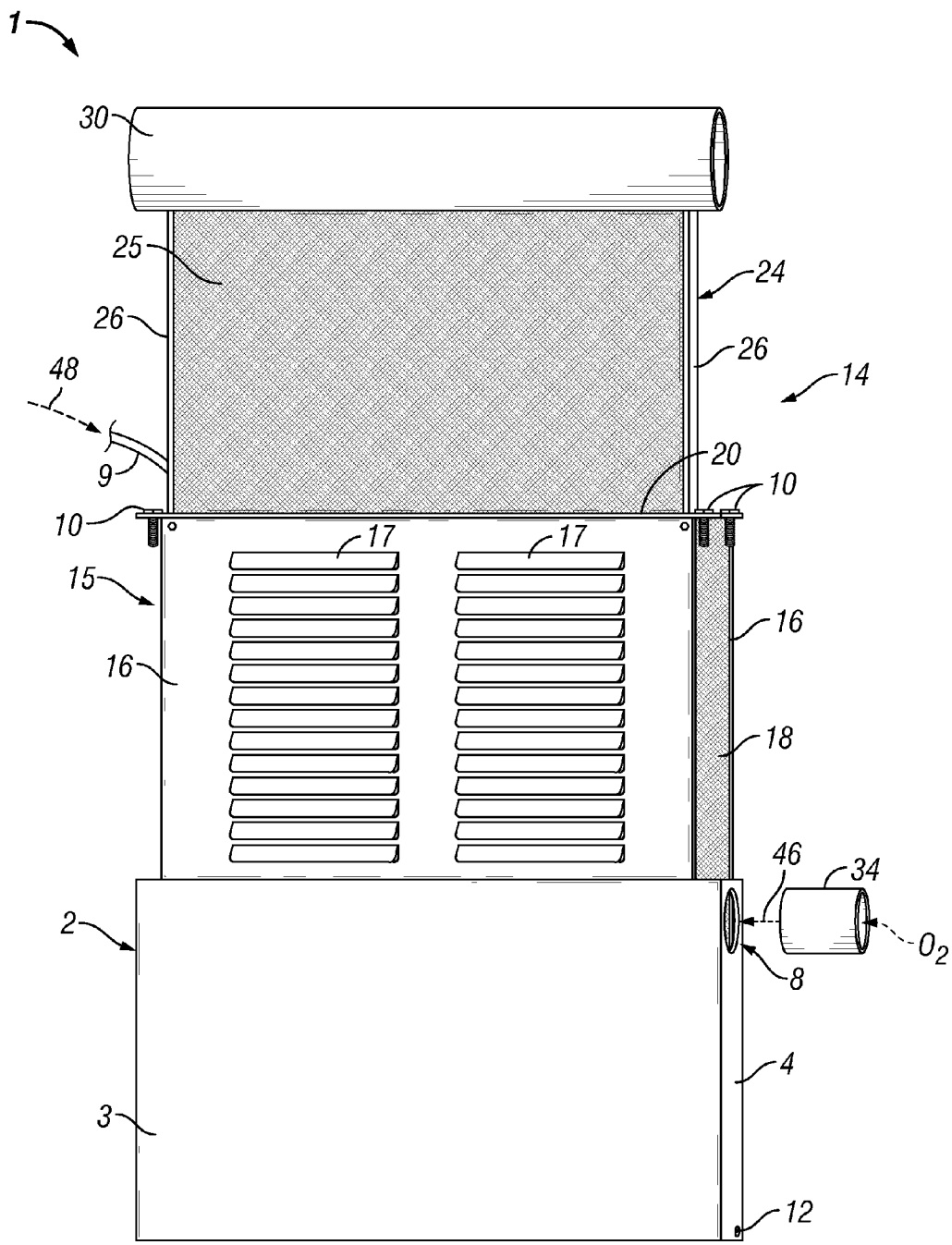
FIG. 2 is an exploded front perspective view of an illustrative embodiment of the system for saturating a liquid with a gas.
Figures 4, 5:
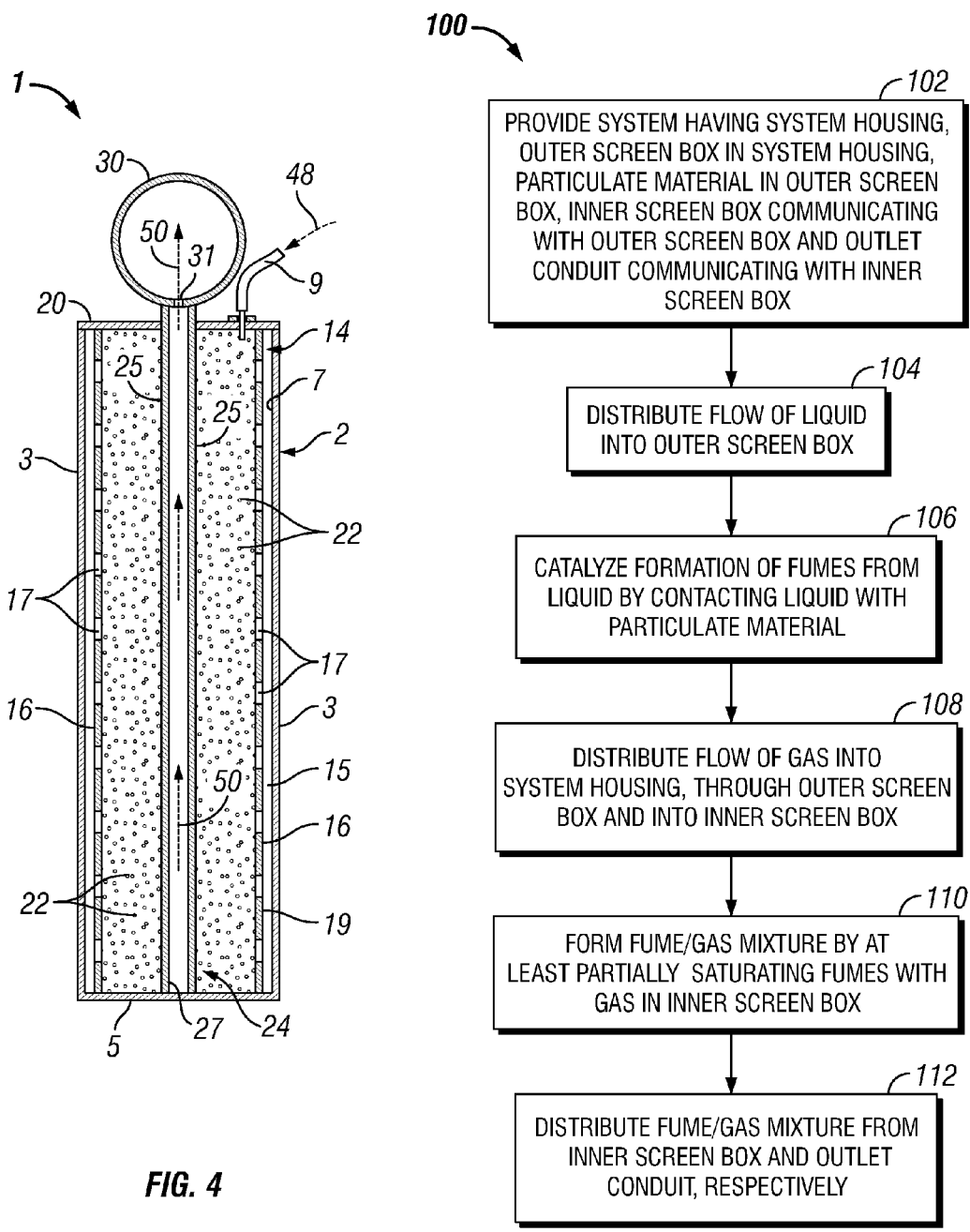
FIG. 4 is a cross-sectional view of an illustrative embodiment of the system for saturating a liquid with a gas.
FIG. 5 is a flow diagram of an illustrative embodiment of a method of saturating a liquid with a gas.

Referring initially to FIGS. 1, 2 and 4 of the drawings, an illustrative embodiment of the system for saturating liquid with a gas, hereinafter system, is generally indicated by reference numeral 1. In some applications, the system 1 may be adapted to saturate liquid fuel with air or oxygen in automotive applications. However, it will be recognized and understood that the system 1 may be adapted to saturate a liquid with a gas in any of a variety of other applications including but not limited to saturation of water with carbon dioxide to form soda water or applications directed to increasing the gas content in malt drinks such as beer.

The system 1 includes a system housing 2 which may include a pair of spaced-apart housing side panels 3, a pair of spaced-apart housing end panels 4 and a housing bottom 5. As illustrated in FIG. 4, the system housing 2 has a housing interior 7. The system housing 2 may be metal such as steel or aluminum, for example and without limitation, or may be an alternative material. A gas inlet opening 8 may be provided in the system housing 2 such as in one of the housing end panels 4, as illustrated, for example and without limitation, which is adapted to facilitate flow of a gas 46 such as air or oxygen into the housing interior 7 for purposes which will be hereinafter described. In some embodiments, a fuel purge outlet 12 may be provided in the system housing 2 in communication with the housing interior 7 for purposes which will be hereinafter described.

A screen assembly 14 is provided in the housing interior 7 of the system housing 2. The screen assembly 14 may include an outer screen box 15 having an outer screen box interior 19 (FIG. 4). In some embodiments, the outer screen box 15 may include a pair of spaced-apart outer screen box side panels 16 and a pair of outer screen box end screens 18. Multiple panel slots 17 may be provided in each outer screen box side panel 16. Accordingly, as illustrated in FIG. 4, the panel slots 17 may establish fluid communication between the housing interior 7 of the system housing 2 and the outer screen box interior 19 of the outer screen box 15. The outer screen box end screens 18 of the outer screen box 15 may further establish fluid communication between the housing interior 7 of the system housing 2 and the outer screen box interior 19 of the outer screen box 15.

As illustrated in FIGS. 1 and 2, a housing lid 20 for the system housing 2 may be provided on the outer screen box side panels 16 and the outer screen box end screens 18 of the outer screen box 15. The housing lid 20 may be attached to the housing side panels 3 and the housing end panels 4 of the system housing 2 using any suitable attachment technique known by those skilled in the art. In some embodiments, multiple lid fasteners 10 may fasten the housing lid 20 to the system housing 2. A liquid inlet 9 may extend through the housing lid 20 and may be provided in fluid communication with the outer screen box interior 19 of the outer screen box 15 for purposes which will be hereinafter described. A generally elongated housing slot 21 (FIG. 2) may be provided in the housing lid 20 for purposes which will be hereinafter described.

As further illustrated in FIG. 4, a particulate material 22 may at least partially fill the outer screen box interior 19 of the screen assembly 14. In some embodiments, the particulate material 22 may include ⅛" clay particles which are tightly packed in the outer screen box interior 19. The particulate material 22 may be any type of chemically inert material and facilitates release of fumes upon contact of liquid fuel with the particulate material 22, as will be hereinafter further described. In some embodiments, the particulate material 22 may be a dense, slightly porous stone or other material.

The screen assembly 14 may further include an inner screen box 24 which is provided in the outer screen box interior 19 of the outer screen box 15. As illustrated in FIGS. 1 and 2, the inner screen box 24 may include a pair of spaced-apart inner screen box side screens 25 and a pair of inner screen box end panels 26 which enclose an inner screen box interior 27 (FIG. 4). The inner screen box 24 may extend through the housing slot 21 which is provided in the housing lid 20. An outlet conduit 30 may be disposed in fluid communication with the inner screen box interior 27 of the inner screen box 24. In some embodiments, the outlet conduit 30 may extend along an edge of the inner screen box 24 outside the housing lid 20 and communicate with the inner screen box interior 27 through at least one communication opening 31, as illustrated.

In general application, the system 1 may be operated to saturate a liquid 48 with a gas 46 in any of a variety of applications. Accordingly, the liquid 48 is distributed into the outer screen box interior 19 (FIG. 4) of the outer screen box 15 through the liquid inlet 9. Simultaneously, due to a pressure drop from the housing interior 7 of the system housing 2 to the outlet conduit 30, the gas 46, which may be air or oxygen, for example and without limitation, is drawn first into the housing interior 7 of the system housing 2 through the gas inlet opening 8 and then into the outer screen box interior 19 (FIG. 4) of the outer screen box 15 through the panel slots 17 in the outer screen box side panels 16 and through the outer screen box end screens 18. The gas 46 is then drawn from the outer screen box interior 19 of the outer screen box 15 into the inner screen box interior 27 of the inner screen box 24 through the inner screen box side screens 25.

In the outer screen box interior 19 of the outer screen box 15, the liquid 48 contacts the particulate material 22, which catalyzes the formation of fumes (not illustrated) in the outer screen box interior 19. By capillary action, the liquid 48 is dispersed through the particulate material 22 and the fumes flow from the outer screen box interior 19 of the outer screen box 15 into the inner screen box interior 27 of the inner screen box 24 through the inner screen box side screens 25 due to the pressure differential between the outlet conduit 30 and the inner screen box interior 27 of the inner screen box 24. In the inner screen box interior 27, the fumes from the liquid 48 mix and become lightly saturated with the gas 46, forming a fume/gas mixture 50. The inner screen box 24 provides rapid communication between the fumes of the liquid 48 and the gas 46, resulting in the desired saturation of the fume/gas mixture 50. The fume/gas mixture 50 is drawn from the inner screen box interior 27 and into the outlet conduit 30 through the communication openings 31. The outlet conduit 30 distributes the fume/gas mixture 50 to a desired destination (not illustrated) for use.

Figure 3:
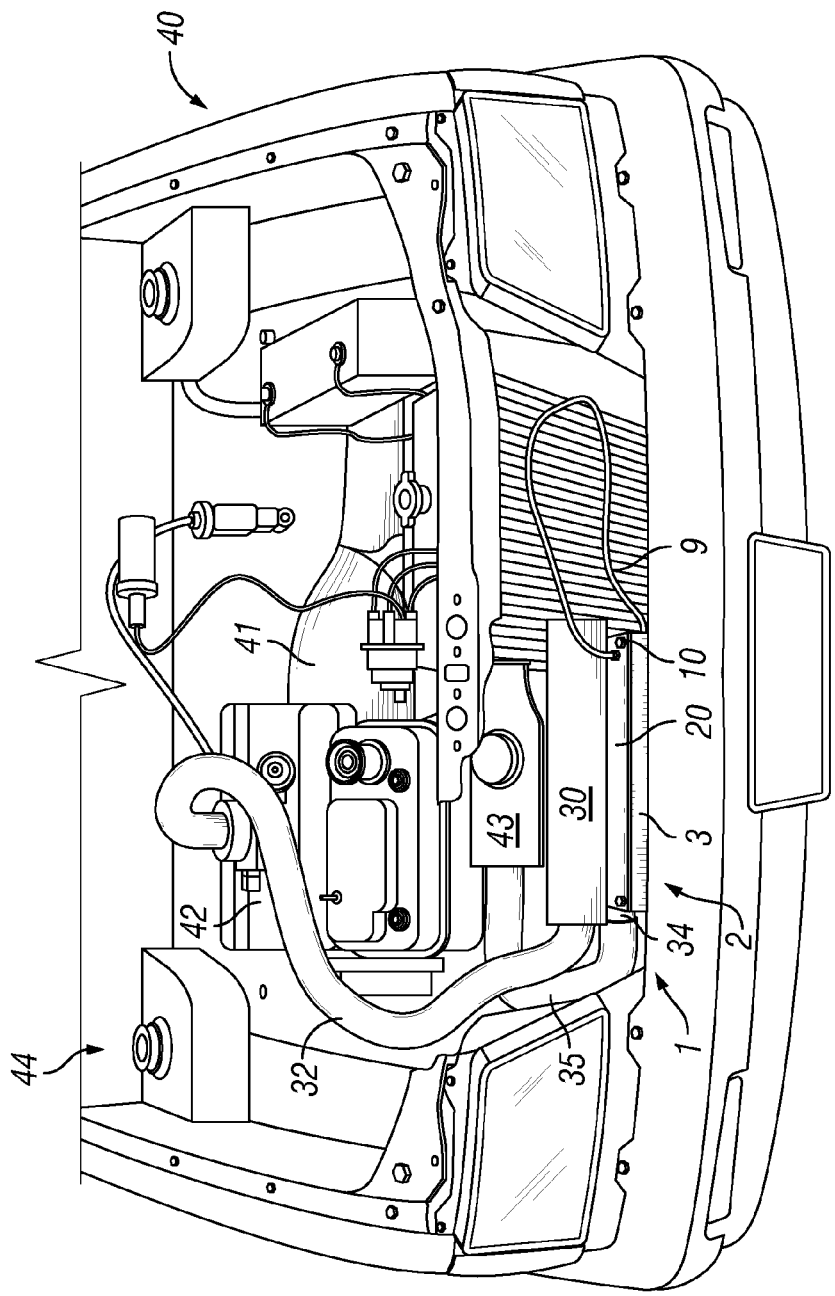
FIG. 3 is a perspective view of an engine compartment of an automobile, with an illustrative embodiment of the system installed in the engine compartment.

Referring next to FIG. 3 of the drawings, exemplary use of the system 1 in an automotive application is illustrated. Accordingly, the system 1 is installed in an engine compartment 44 of the automobile 40. The liquid inlet 9 which is disposed in fluid communication with the housing interior 7 of the system housing 2 may be connected to the fuel tank (not illustrated) of the automobile 40 through a fuel pump (not illustrated). The gas inlet opening 8 which is provided in the system housing 2 may be disposed in fluid communication with the radiator or other source or air or oxygen 43 through a gas inlet hose 35 a gas inlet conduit 34 (FIG. 2). The outlet conduit 30 of the system 1 may be disposed in fluid communication with an intake manifold 42 of the automobile engine 41 through a fuel outlet hose 32. The fuel purge outlet 12 may be disposed in fluid communication with the fuel tank (not illustrated) of the automobile 40 through a suitable purge outlet conduit (not illustrated).

During operation of the automobile 40, fuel 48 is distributed from the pump (not illustrated) which is connected to the fuel tank (not illustrated) of the automobile 40 into the outer screen box interior 19 of the outer screen box 15 through the liquid inlet 9. The gas 46, which may be air or oxygen, for example and without limitation, is drawn from the radiator 43 or other gas source through the gas inlet hose 35 and gas inlet conduit 34 and into the housing interior 7 of the system housing 2 through the gas inlet opening 8. From the housing interior 7 of the system housing 2, the gas 46 flows into the outer screen box interior 19 of the outer screen box 15 through the panel slots 17 in the outer screen box side panels 16 and through the outer screen box end screens 18 of the outer screen box 15. The gas 46 then flows into the inner screen box interior 27 of the inner screen box 24 through the inner screen box side screens 25.

In the outer screen box interior 19 of the outer screen box 15, the fuel 48 contacts the particulate material 22, which catalyzes the formation of fumes (not illustrated) in the outer screen box interior 19. By capillary action, the fuel 48 is dispersed through the particulate material 22. The fumes from the fuel 48 are drawn from the outer screen box interior 19 into the inner screen box interior 27 of the inner screen box 24 through the inner screen box side screens 25. In the inner screen box interior 27, the fumes mix and become lightly saturated with the gas 46, forming a fume/gas mixture 50. Due to the pressure differential between the outlet conduit 30 and the inner screen box interior 27 of the inner screen box 24, the fume/gas mixture 50 is drawn from the inner screen box interior 27 and into the outlet conduit 30 through the communication openings 31. The fuel outlet hose 32 distributes the fume/gas mixture 50 from the outlet conduit 30 to the intake manifold 42, which directs the fuel/gas mixture 50 into the combustion chambers (not illustrated) of the automobile engine 41 typically in the conventional manner for combustion and operation of the engine 41. Un-vaporized fuel may be distributed from the housing interior 7 of the system housing 2 back to the fuel tank (not illustrated) through the fuel purge outlet 12.

Once the fuel 48 is introduced at full liquid output onto the particulate material 22 for saturation, the partially vacuum induced in the intake manifold (not illustrated) of the engine 41 naturally meters the fume/air mixture 50 to the intake manifold 42. This metering effect runs from ignition throughout the entire speed range of the automobile engine 41. The reduced size of the fuel molecules in the fuel/gas mixture 50 increases the surface area for combustion of the fuel in the fuel/gas mixture 50, resulting in a more complete burn (nearly 100%).

Referring next to FIG. 5, a flow diagram 100 of an illustrative embodiment of a method of saturating a liquid with a gas is illustrated. In block 102, a system for saturating a liquid with a gas is provided. The system may include a system housing, an outer screen box in the system housing, a particulate material in the outer screen box, an inner screen box communicating with the outer screen box and an outlet conduit communicating with the inner screen box. In block 104, a flow of liquid may be distributed into the outer screen box. In automotive applications, the liquid may be a liquid fuel. In block 106, formation of fumes from the liquid is catalyzed as the liquid contacts the particulate material in the outer screen box. In block 108, a flow of gas is distributed into the system housing, through the outer screen box and into the inner screen box. In automotive applications, the gas may be air or oxygen. In block 110, a fume/gas mixture is formed by at least partially saturating the fumes with the gas in the inner screen box. In block 112, the fume/gas mixture is distributed from the inner screen box and the outlet conduit, respectively.

While the preferred embodiments of the disclosure have been described above, it will be recognized and understood that various modifications can be made in the disclosure and the appended claims are intended to cover all such modifications which may fall within the spirit and scope of the disclosure.

What is claimed is:

1. A system for saturating a liquid with a gas, comprising:
a first screen box;
a particulate material provided in the first screen box;
a liquid inlet disposed in fluid communication with the first screen box;
a second screen box disposed in fluid communication with the first screen box;
a gas inlet disposed in fluid communication with the second screen box; and
an outlet conduit disposed in fluid communication with the second screen box.

2. The system of claim 1 wherein the first screen box comprises a pair of spaced-apart outer screen box side panels and a pair of spaced-apart outer screen box end screens.

3. The system of claim 2 further comprising a plurality of panel slots provided in each of the outer screen box side panels.

4. The system of claim 1 wherein the second screen box is disposed inside the first screen box.

5. The system of claim 1 wherein the particulate material comprises clay.

6. The system of claim 1 wherein the particulate material comprises porous stone.

7. The system of claim 1 wherein the second screen box comprises a pair of spaced-apart inner screen box side screens and a pair of spaced-apart inner screen box end panels.

8. The system of claim 1 further comprising a purge outlet disposed in fluid communication with the first screen box.

9. A system for saturating a liquid with a gas, comprising:
a system housing;
a housing lid having a housing slot carried by the system housing;
a first screen box provided in the system housing;
a particulate material provided in the first screen box;
a liquid inlet disposed in fluid communication with the first screen box;
a second screen box extending through the housing slot of the housing lid and disposed in fluid communication with the first screen box;
a gas inlet opening provided in the system housing and disposed in fluid communication with the first screen box and the second screen box; and
an outlet conduit disposed in fluid communication with the second screen box.

10. The system of claim 9 wherein the first screen box comprises a pair of spaced-apart outer screen box side panels and a pair of spaced-apart outer screen box end screens.

11. The system of claim 10 further comprising a plurality of panel slots provided in each of the outer screen box side panels.

12. The system of claim 9 wherein the second screen box is disposed inside the first screen box.

13. The system of claim 9 wherein the particulate material comprises clay.

14. The system of claim 9 wherein the particulate material comprises porous stone.

15. The system of claim 9 wherein the second screen box comprises a pair of spaced-apart inner screen box side screens and a pair of spaced-apart inner screen box end panels.

16. The system of claim 9 further comprising a purge outlet disposed in fluid communication with the first screen box.

* * * * *